United States Patent [19]

Nagai et al.

[11] Patent Number: 5,484,051
[45] Date of Patent: Jan. 16, 1996

[54] BALANCER

[75] Inventors: Shigekazu Nagai; Tadasu Kawamoto; Teruo Inaba, all of Ibaraki, Japan

[73] Assignee: SMC Kabushiki Kaisha, Tokyo, Japan

[21] Appl. No.: 314,624

[22] Filed: Sep. 29, 1994

[30] Foreign Application Priority Data

Oct. 12, 1993 [JP] Japan .................................. 5-280122

[51] Int. Cl.⁶ .................................................. B65G 25/00
[52] U.S. Cl. ...................................... 198/750.7; 198/468.8
[58] Field of Search ......................... 198/468.01, 468.5, 198/468.8, 468.9, 750.1, 750.5, 750.7, 690.1; 187/267, 274

[56] References Cited

U.S. PATENT DOCUMENTS 4,854,444   8/1989   Iwamoto ............................ 198/750.7
5,147,031   9/1992   Carpenter .......................... 198/750.7

FOREIGN PATENT DOCUMENTS 1157882   11/1963   Germany .
3240105    5/1983   Germany .

Primary Examiner—James R. Bidwell
Attorney, Agent, or Firm—Oblon, Spivak, McClelland, Maier & Neustadt

[57] ABSTRACT

A balancer is installed with a frame directed substantially vertically. When an electric motor is energized, a ball screw shaft is rotated about its own axis, displacing a table mechanism in a substantially vertical direction. Simultaneously, a cylinder in the frame is operated to move a piston substantially vertically. At this time, magnets on the piston and magnets in the table mechanism are magnetically attracted to each other, so that the table mechanism is pulled in the same direction as the piston. Consequently, the burden on the electric motor which is loaded by the weight of a workpiece carried by the table mechanism is lessened.

4 Claims, 6 Drawing Sheets 5,484,051

BALANCER

BACKGROUND OF THE INVENTION

1. Field of the Invention

The present invention relates to a balancer for use in a conveyor apparatus, a machining apparatus, or the like which is displaceable vertically, for pneumatically or hydraulically applying forces against a downward load imposed by a large weight of the apparatus itself or a workpiece supported thereby to reduce the burden on a power source of the apparatus.

2. Description of the Related Art

Cylinders have heretofore been used in certain applications for conveying heavy workpieces substantially upwardly. To position a workpiece in a vertical direction with a cylinder, a pressure fluid control valve or the like is operated to equalize a primary pressure supplied to the cylinder and a secondary pressure discharged from the cylinder for thereby holding the cylinder in a corresponding operative position.

However, since the workpiece is positioned with a cylinder using a fluid under pressure, the response speed is low. In addition, when the primary pressure supplied to the cylinder fluctuates, it is not possible to position the workpiece accurately.

In view of the above problems, it has been customary to employ a balancer composed of a cylinder and an actuator which comprises an electric motor for rotating a ball screw that functions as a drive force transmitting shaft. The balancer can convey a heavy workpiece upwardly by lessening, with the cylinder, any excessive burden that is applied to the electric motor by the weight of the workpiece. The balancer is capable of positioning the workpiece highly accurately by introducing a signal from a detector such as an encoder as being indicative of the rotational speed of the electric motor.

The actuator and the cylinder, which are separate members, are coupled to each other. The cylinder is exposed from the body of the actuator, and requires an additional space for installation. When the ball screw is rotated by the electric motor, a table mechanism is displaced to move the workpiece supported thereon. The table mechanism needs to be connected to the piston rod of the cylinder by a certain mechanism. Consequently, the number of parts of the conventional balancer is relatively large.

SUMMARY OF THE INVENTION

It is therefore an object of the present invention to provide a balancer which has rodless cylinders incorporated in an actuator, the balancer being made up of a relatively small number of parts, having a relatively simple structure, and requiring a relatively small installation space.

To achieve the above object, there is provided in accordance with the present invention a balancer for pneumatically or hydraulically applying forces to reduce a burden on a power source for moving a workpiece or an apparatus, comprising an elongate frame, at least one cylinder disposed in and extending longitudinally along the elongate frame, for displacing a piston longitudinally in a chamber defined in the cylinder, a table mechanism movable longitudinally along the cylinder, a drive source for moving the table mechanism, and drive force transmitting means coupled to the drive source for transmitting a drive force produced by the drive source to the table mechanism, the table mechanism having a first magnet disposed closely to an outer circumferential surface of the cylinder, the piston having a second magnet positioned for magnetic coaction with the first magnet.

Either one of the first and second magnets may be replaced with a magnetic member.

The table mechanism may be movable by either operation of the drive force transmitting means or displacement of the piston.

Each of the first and second magnets may comprise an electromagnet.

When the drive source and the cylinder simultaneously are operated, the piston is displaced substantially vertically. Since the first magnet of the table mechanism and the second magnet of the piston are magnetically attracted to each other, the table mechanism is pulled in the same direction as the piston. Consequently, the burden on the power source which is loaded by the weight of a workpiece carried by the table mechanism is lessened.

Since at least one cylinder is disposed in the frame, the balancer is made compact and may be installed in a small space. The balancer is free of any mechanism which would be required to connect a piston rod for transmitting the drive force of a cylinder to the table mechanism of an actuator if the cylinder and the actuator were coupled to each other as is the case with the conventional balancer. In the absence of such a mechanism, the balancer according to the present invention is made up of a relatively small number of parts and can be manufactured relatively inexpensively.

If the first and second magnets comprise electromagnets, then they have increased durability and can be manufactured at reduced cost.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

FIGS. 1 through 5 show a balancer 10 according to an embodiment of the present invention.

Figure 5:
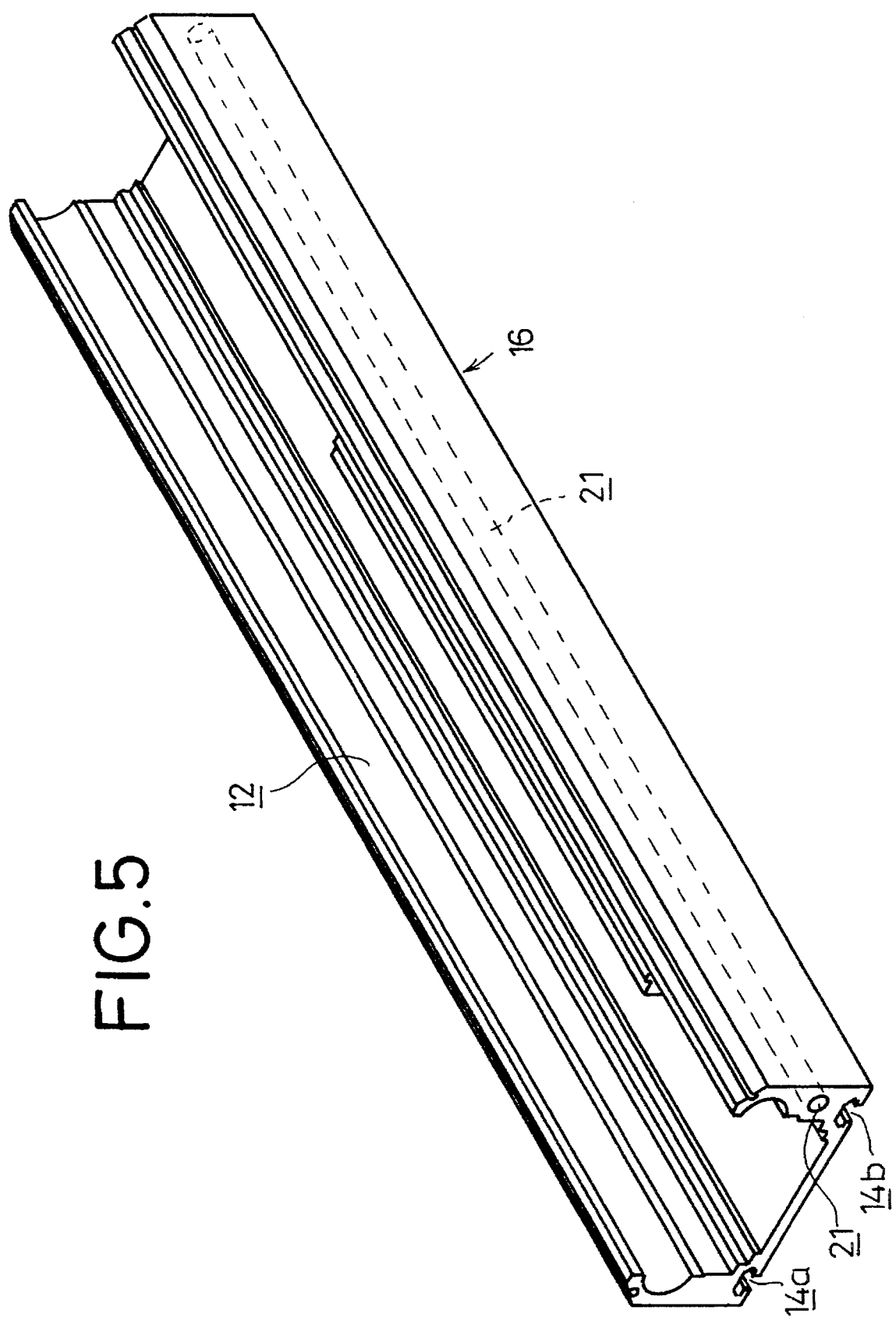
FIG. 5 is a perspective view of a frame of the balancer shown in FIG. 1.

As shown in FIG. 5, the balancer 10 has an elongate frame 16 having an opening or recess 12 defined therein which extends fully longitudinally therethrough. The frame 16 also has a pair of transversely spaced grooves 14a, 14b of substantially T-shaped cross section which are defined in a bottom surface facing away from the opening 12. The grooves 14a, 14b are used to install the balancer 10 on an apparatus (not shown) which is to be combined with the balancer 10.

Figure 1:
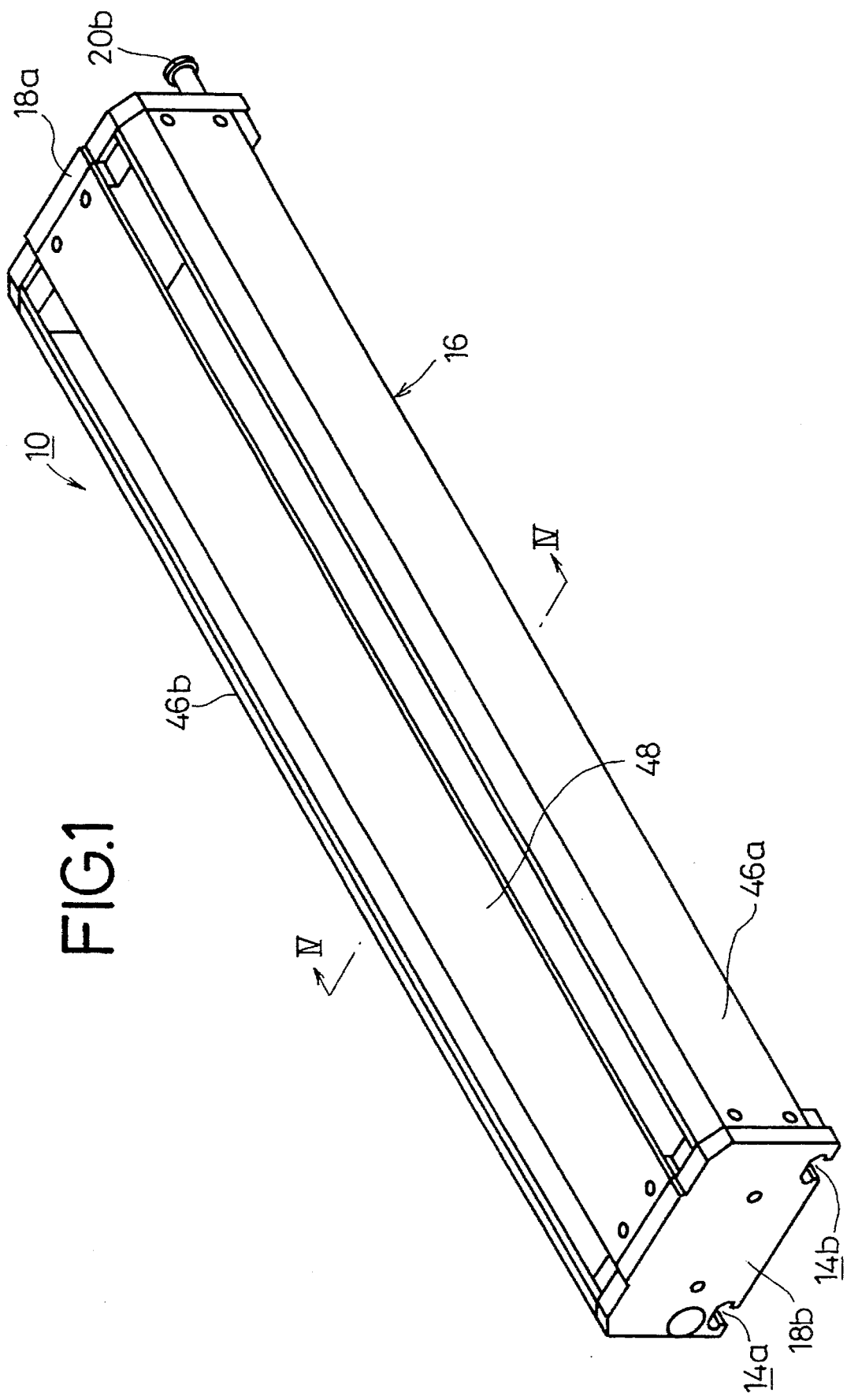
FIG. 1 is a perspective view of a balancer according to an embodiment of the present invention.
Figure 2:
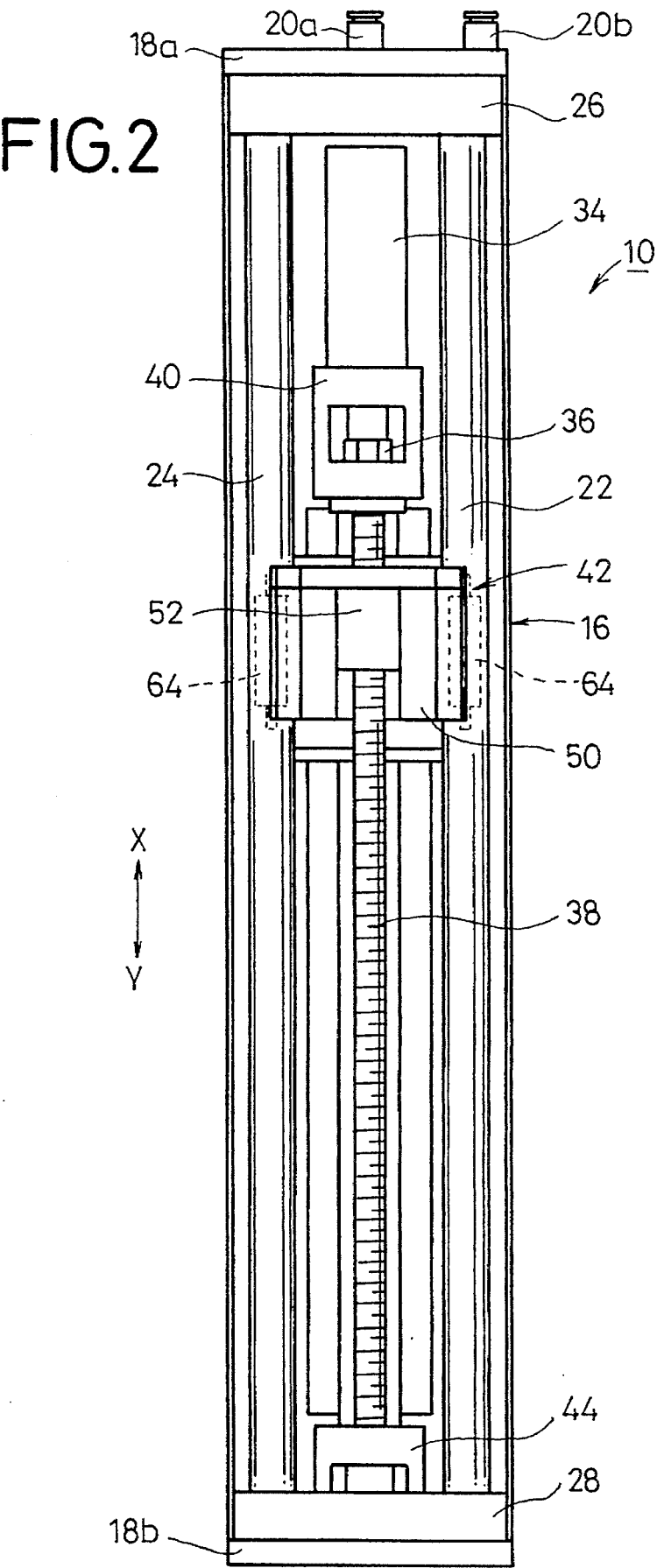
FIG. 2 is a plan view of the balancer shown in FIG. 1, with a top cover removed therefrom.

As shown in FIGS. 1 and 2, the balancer 10 includes a pair of end covers 18a, 18b coupled respectively to the longitudinal opposite ends of the frame 16, and a pair of pipe joints 20a, 20b connected to the end cover 18a. The pipe joint 20a, which is positioned substantially centrally on the end cover 18a, is vented to the atmosphere and serves to discharge a fluid under pressure from the balancer 10. The pipe joint 20b serves as a port for supplying a fluid under pressure into the balancer 10. The frame 16 has a passage 21 (see FIG. 5) defined therein and extending fully longitudinally therethrough for delivering a fluid under pressure introduced from the pipe joint 20b to the opposite end plate 28. The passage 21 is connected to the pipe joint 20b through a hole (not shown) defined in the end plate 26. Since the passage 21 is defined in the frame 16, it is not necessary to employ an external fluid passage outside of the balancer 10. Therefore, the balancer 10 can be installed in a small space without undue limitations, so that an effective space utilization can be achieved by the balancer 10.

Figure 3:
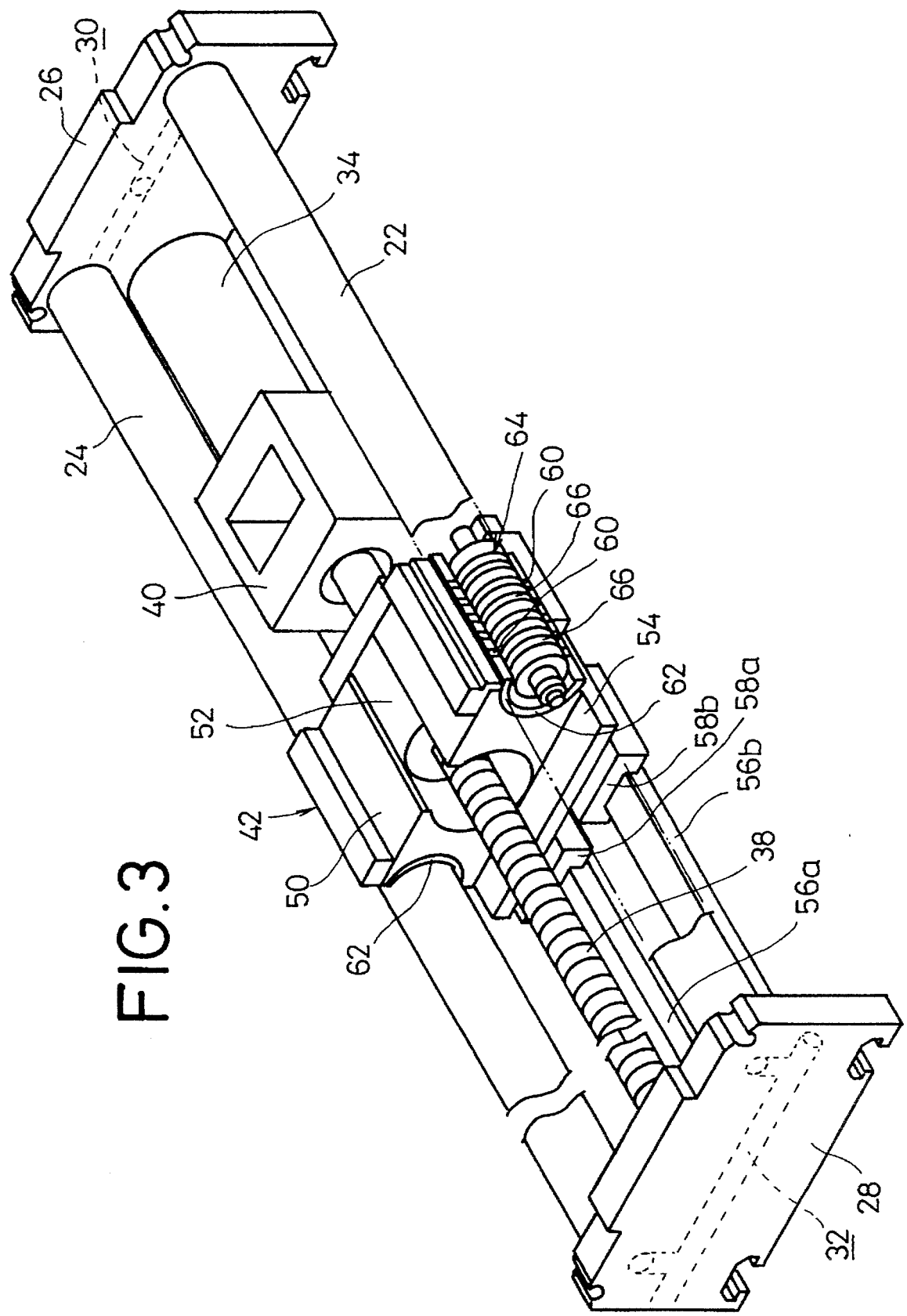
FIG. 3 is a fragmentary perspective view, partly broken away, of the balancer shown in FIG. 1.

As shown in FIG. 3, a pair of parallel cylinder tubes 22, 24 spaced transversely from each other is disposed in the opening 12 of the frame 16. End plates 26, 28 (see FIGS. 2 and 3) are hermetically joined to longitudinal opposite ends of the cylinder tubes 22, 24. The end plate 26 has a passage 30 defined therein which communicates between the pipe joint 20a and chambers that are defined in the respective cylinder tubes 22, 24. The end plate 28 has a passage 32 defined therein in communication with the passage 21 and the chambers in the cylinder tubes 22, 24.

As shown in FIGS. 2 and 3, the opening 12 accommodates therein an electric motor 34 positioned closely to the end plate 26, a coupling block 40 which couples the rotatable shaft of the electric motor 34 coaxially to an end of a ball screw shaft 38 through a coupling member 36, a table mechanism 42 for supporting a workpiece thereon, and a bearing block 44 which supports the other end of the ball screw shaft 38 on the end plate 28.

Figure 4:
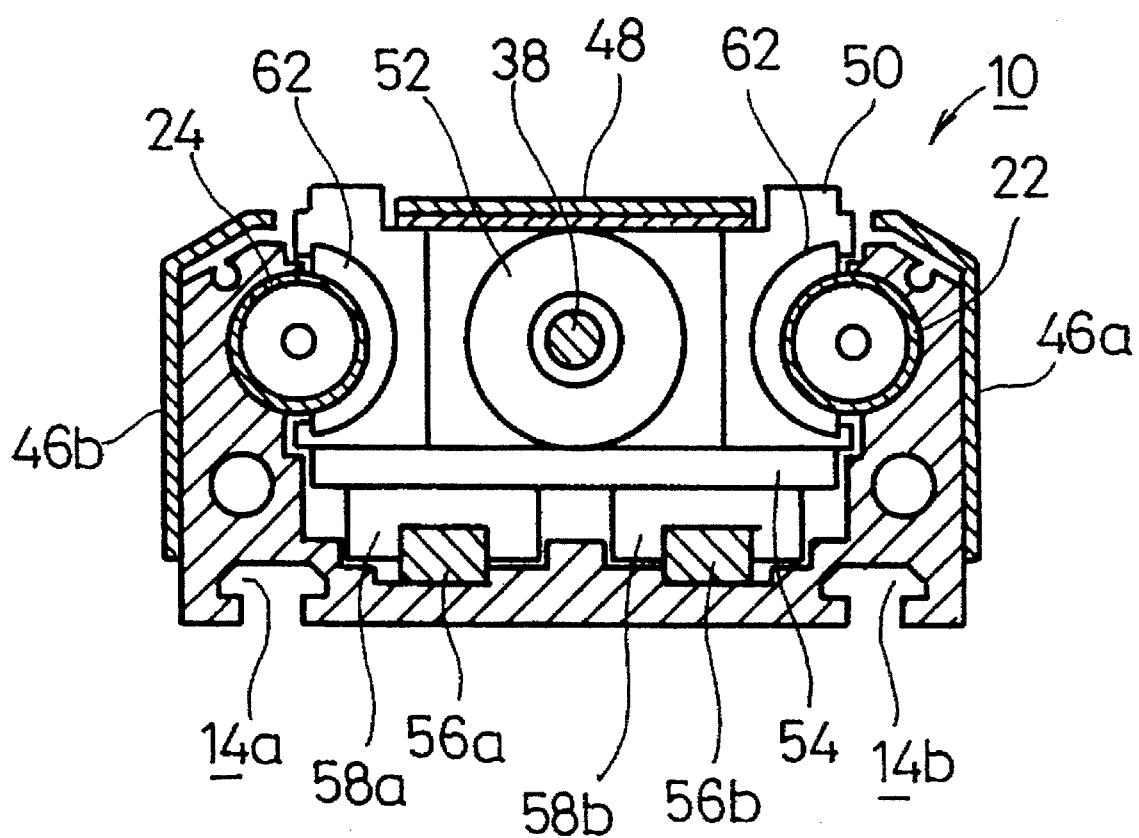
FIG. 4 is a cross-sectional view taken along line IV—IV of FIG. 1.

As shown in FIGS. 1 and 4, side covers 46a, 46b are mounted respectively on transverse sides of the frame 16, and a top cover 48 is connected at its longitudinal ends to upper surfaces of the end covers 18a, 18b for covering the opening 12 except for elongate gaps through which the table mechanism 42 moves.

As shown in FIGS. 3 and 4, the table mechanism 42 is disposed between the cylinder tubes 22, 24. The table mechanism 42 comprises a table block 50 slidably movable on outer circumferential surfaces of the cylinder tubes 22, 24 in the longitudinal direction of the frame 16, the table block 50 has a substantially cylindrical recess defined therein, a slide block 52 fixedly disposed in the substantially cylindrical recess in the table block 50 and threaded over the ball screw shaft 38, a plate 54 fixed to the bottom of the table block 50, a pair of guide members 56a, 56b fixedly mounted on the bottom of the opening 12 and extending longitudinally thereof, the guide members 56a, 56b being spaced transversely from each other, and a pair of slide members 58a, 58b attached to the plate 54 and held in slidable contact with the respective guide members 56a, 56b. The table block 50 has a pair of recesses of substantially semicircular cross section defined in respective outer side surfaces thereof and extending in the longitudinal direction of the cylinder tubes 22, 24, the recesses opening toward the outer circumferential surfaces of the cylinder tubes 22, 24. Semicylindrical members 62 each supporting a plurality of parallel permanent magnets 60 of substantially semicircular cross section are fixedly mounted in the respective recesses of the table block 50. The permanent magnets 60 may not necessarily be of a substantially semicircular cross section, but may be of any cross-sectional shape which surrounds partly or wholly the outer circumferential surfaces of the cylinder tubes 22, 24.

Pistons 64 are positioned in the chambers in the cylinder tubes 22, 24 for reciprocating movement in the chambers under a fluid pressure. Since the pistons 64 are identical in structure to each other, only one of the pistons 64 will be described in detail below. A plurality of parallel permanent magnets 66 which are substantially disk-shaped are mounted on the piston 64. The cylinder tubes 22, 24 and the pistons 64 jointly constitute rodless cylinders in which no piston rods are connected to the pistons 64. Any displacement of the pistons 64 in the chambers in the cylinder tubes 22 can be transmitted to the table mechanism 42 through a magnetic action between the permanent magnets 60, 66. While both the table block 50 and the pistons 64 have the permanent magnets 60, 66 in the illustrated embodiment, these permanent magnets 60, 66 may be dispensed with, and either the table block 50 or the pistons 64 may be made of a permanent magnet and the other may be made of a magnetic material. Alternatively, the permanent magnets 60, 66 may be replaced with electromagnets for increased durability and reduced cost.

Operation of the balancer 10 shown in FIGS. 1 through 5 will be described below.

Typically, the balancer 10 may be used as an air balancer. First, the balancer 10 is installed in a substantially vertical direction and fixed in the upstanding position by a suitable fixing device (not shown). As shown in FIG. 2, the end cover 18a with the pipe joints 20a, 20b fixed thereto is oriented upwardly, and a tube or the like is connected to the pipe joint 20b with the other pipe joint 20a open.

Compressed air is introduced into the balancer 10 through the tube and the pipe joint 20b, and the electric motor 34 is energized by a power supply (not shown) electrically connected to the electric motor 34. When the electric motor 34 is energized, the ball screw shaft 38 is rotated about its own axis, displacing the table mechanism 42 in the direction indicated by the arrow X in FIG. 2.

The compressed air introduced from the pipe joint 20b flows through the hole in the end plate 26 and the passage 21 defined in the frame 16 into passage 32 in the end plate 28. The compressed air is then supplied from the passage 32 simultaneously into chambers in the cylinder tubes 22, 24. The pistons 64 in the chambers in the cylinder tubes 22, 24 are now pushed in the direction X by the supplied compressed air. At this time, the disk-shaped permanent magnets 66 mounted on the pistons 64 magnetically pull the permanent magnets 60 supported by the semicylindrical members 62 fixed to the table block 50. Therefore, when the pistons 64 in the chambers in the parallel cylinder tubes 22, 24 are displaced in the direction X, the table block 50 is pulled also in the direction X.

Consequently, the table mechanism 42 is displaced in the direction X by both the rotation of the ball screw shaft 38 by the electric motor 34 and the displacement and hence magnetic action of the pistons 64 which move in the cylinder tubes 22, 24. Even if a workpiece carried on the table mechanism 42 is heavy, any load imposed on the electric motor 34 by the workpiece is reduced, and the heavy workpiece can be conveyed in the direction X. If an encoder (not shown) is connected to the electric motor 34, then it is possible to detect the position of the workpiece based on a signal from the encoder and hence to position the workpiece highly accurately in the direction X.

The balancer 10 according to the above embodiment functions as a vertical air balancer which operates based on the coaction of the electric motor 34 and the two rodless cylinders for vertically conveying a workpiece. However, the balancer 10 may be placed substantially horizontally and either the electric motor 34 or the rodless cylinders may be operated to convey a workpiece horizontally.

The rodless cylinders may be supplied with oil under pressure rather than compressed air.

While the two parallel cylinder tubes 22, 24 and hence the two parallel rodless cylinders are disposed in the opening 12 in the above embodiment, the balancer 10 may have only one rodless cylinder in combination with the electric motor 34.

Figure 6:
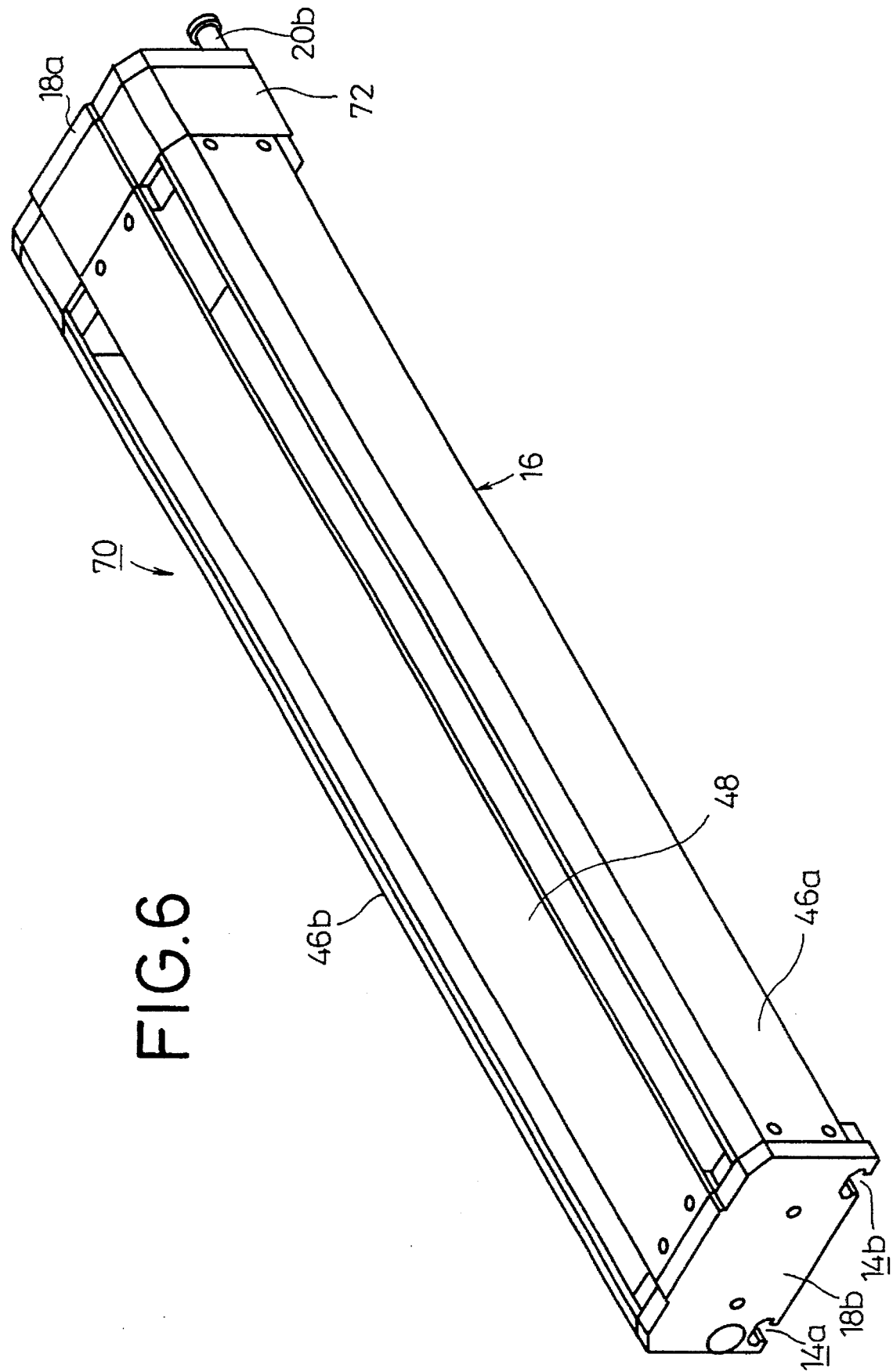
FIG. 6 is a perspective view of a balancer according to another embodiment of the present invention.

FIG. 6 shows in perspective a balancer 70 according to another embodiment of the present invention. The balancer 70 differs from the balancer 10 shown in FIG. 1 in that a block 72 housing a regulator, a fluid control valve, a centralized wiring system, and a centralized piping system is coupled to an end of the frame 16. The balancer 70 can be installed easily in place because motor wires and fluid pipes can be connected through the block 72.

Although certain preferred embodiments of the present invention has been shown and described in detail, it should be understood that various changes and modifications may be made therein without departing from the scope of the appended claims.

What is claimed is:

1. A balancer for pneumatically or hydraulically applying forces to reduce a burden on a power source for moving a workpiece or an apparatus, comprising:

an elongate frame;

at least one cylinder disposed in and extending longitudinally along said elongate frame, for displacing a piston longitudinally in a chamber defined in said cylinder;

a table mechanism movable longitudinally along said cylinder;

a drive source for moving said table mechanism; and drive force transmitting means coupled to said drive source for transmitting a drive force produced by said drive source to said table mechanism;

said table mechanism having a first magnet disposed closely to an outer circumferential surface of said cylinder, said piston having a second magnet positioned for magnetic coaction with said first magnet.

2. A balancer according to claim 1, wherein either one of said first and second magnets is replaced with a magnetic member.

3. A balancer according; to claim 1 or 2, wherein said table mechanism is movable by either operation of said drive force transmitting means or displacement of said piston.

4. A balancer according to claim 1 or 2, wherein each of said first and second magnets comprises an electromagnet.

\* \* \* \* \*